Figure 1:
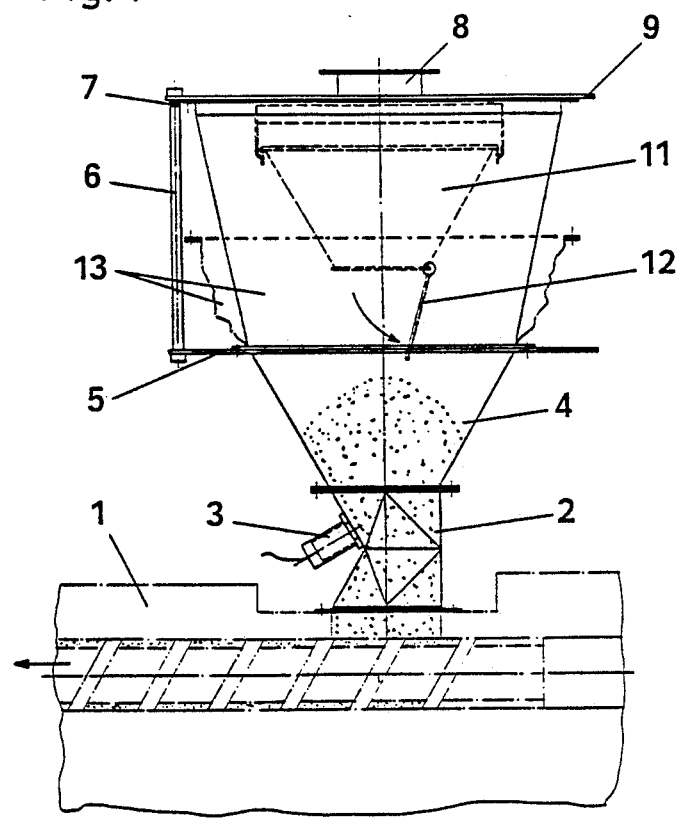

United States Patent [19]

Neumann

[11] Patent Number: 4,809,795
[45] Date of Patent: Mar. 7, 1989

[54] SUPPORT FRAME-FREE HOPPER-TYPE WEIGHING DEVICE FOR EXTRUDERS

[76] Inventor: Ulrich Neumann, Im Kerksiek 10, D-4970 Bad Oeynhausen 1, Fed. Rep. of Germany

[21] Appl. No.: 94,730

[22] PCT Filed: Nov. 27, 1986

[86] PCT No.: PCT/DE86/00481
§ 371 Date: Jul. 22, 1987
§ 102(e) Date: Jul. 22, 1987

[87] PCT Pub. No.: WO87/03366
PCT Pub. Date: Jun. 4, 1987

[30] Foreign Application Priority Data
Dec. 5, 1985 [DE] Fed. Rep. of Germany ....... 3542560

[51] Int. Cl.[4] .................. G01G 13/16; G01G 13/24; G01G 23/10
[52] U.S. Cl. .................................. 177/59; 177/114; 177/185
[58] Field of Search .................. 177/59, 114, 185

[56] References Cited

U.S. PATENT DOCUMENTS

| 2,822,577 | 2/1958 | Schieser et al. | 425/148 |
| 2,853,105 | 9/1958 | Brown | 177/59 X |
| 3,618,684 | 11/1971 | Burke et al. | 177/114 |

Primary Examiner—George H. Miller, Jr.
Attorney, Agent, or Firm—Max Fogiel

[57] ABSTRACT

An arrangement for continuous feeding of an extruder of plastics, in which a casing receives a weighing container and has an upper part and a lower part. A weighing bar is located in the upper part of the casing. The lower part is closed and has a hopper shape. A casing cover plate carries the weighing container with the weighing bar. A material feed nozzle is mounted on the casing cover plate, and an outlet chute is connected to the lower part of the casing. A level switch in the chute signals when the next batch to be fed to the extruder is to be weighed. Distance spacing elements support the casing cover plate on the lower part of the casing. Vibration dampers are provided under the casing cover plate. An elastic hose element surrounds the weighing container and has secured sealed ends. The elastic hose element extends betwee the casing cover plate and the lower part of the casing.

9 Claims, 1 Drawing Sheet

SUPPORT FRAME-FREE HOPPER-TYPE WEIGHING DEVICE FOR EXTRUDERS

The invention relates to a hopper-type weighing device for regulating the throughflow of material as well as the weighed-out quantity for the extrusion of plastics, comprising a weighing container provided with a discharge flap, a casing designed in two parts, receiving the weighing container with the weighing bar in the upper part and closed in the shape of hopper in the lower part, a material feed nozzle mounted on the casing cover-plate and an outlet chute which is connected to the lower casing component and in which a level switch calling for the next batch to be weighed is installed.

Since hopper-type weighing devices of the above-mentioned type have to be so arranged as to be unaffected by the drive vibrations of the extruder, up until now it has been usual to suspend them free from vibration on a separate support frame. This frame, standing on the shop floor and designed as an accessible platform, for its part requires, however, a considerable structural outlay and a not inconsiderable headroom. The latter is often not available, particularly in the case of machines originally planned without hopper-type weighing device, wich therefore makes retrofitting with such hopper-type weighing devices attached in the known form impossible. A further disadvantage which both makes the system more expensive and additionally increases the headroom is that a flexible connecting piece always has to be provided between the conventional hopper-type weighing devices and the extruder inlet.

The object of the invention is to create a hopper-type weighing device which manages without its own support frame, so that there is neither the associated structural outlay nor the unfavorable large headroom.

In accordance with the present invention, there is provided a hopper-type weighing device for the extrusion of plastics, in which a weighing container has a discharge flap. A casing with two parts receiving the weighing container with a weighing bar in the upper part. The lower part of the casing is closed and is in the shape of a hopper. A material feed nozzle is mounted on the casing cover plate, and an outlet chute is connected to the lower casing component. A limit switch calls for the next batch to be weighed, and is installed in the lower casing component. The casing cover plate carries the weighing container with the weighing bar and is supported via distance elements and vibration dampers, on the lower hopper-shape casing component. An elastic hose member surrounds the weighing container, and is secured at both ends in a sealed manner. The elastic hose member extends between the casing cover plate and the lower casing component.

To achieve the object set, a hopper-type weighing device with the features emerging from the claims is proposed.

Figure 2:
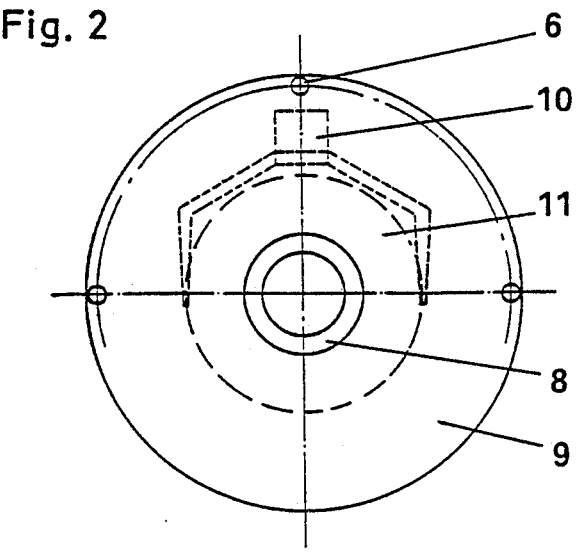

An exemplary embodiment of the subject-matter of the application will be explained below with reference to the drawings, in which specifically, FIG. 1 shows the diagrammatic side view of a hopper-type weighing device according to the invention, and FIG. 2 shows the hopper-type weighing device described, in plan view.

The hopper-type weighing device depicted is intended for regulating the throughflow of material as well as the weighed-out quantity for the extrusion of plastics. It is mounted on the extruder 1 with an outlet chute 2, in which a level switch 3 calling for the next batch to be weighed is located. A lower hopper-shaped casing component 4 is screwed to the outlet chute 2 via a flange connection.

The lower hopper-shaped casing component 4 carries a casing plate 5, from which semi-circular distance pieces 6 disposed thereupon extend upward. These distance pieces 6 are connected via vibration dampers 7 to a casing cover-plate 9 receiving a central material feed nozzle 8. Suspended from the casing cover-plate is the likewise hopper-shaped weighing container 11, which is provided with the weighing bar 10 and to which a discharge flap 12, controlled by the level switch 3, is hinged.

Since the weighing operation has to take place in an enclosed space on account of the generation of dust occurring, the weighing container 11 is surrounded by an elastic hose piece 13 extending between the casing cover-plate 9 and the casing plate 5 of the lower casing component 4. This elastic hose piece 13 is made of anti-static filter fabric and has the shape of a downward-tapering truncated cone. It is secured at both ends, i.e. both at the casing cover-plate 9 and at the casing plate 5, in a sealed manner, for which purpose its edges may be provided with easily detachable quick-acting closures. In this way it is possible, whenever cleaning, maintenance of calibration of the weighing device is required, to lower the hose piece 13 onto the casing plate 5, as shown in FIG. 1, or to remove it in the direction of the side opened between the distance pieces 6.

When processing a material giving off less dust, instead of filter fabric, the hose piece 13 can also be made completely or partially of transparent foil, and thus allow constant observation of the weighing operations.

The advantages of the novel hopper-type weighing device are mainly constituted by the elimination of an expensive support frame, so that at the same time a very small headroom results, by virtue of which it can be used and retrofitted in virtually all applications arising. In addition, it is distinguished in comparison with the earlier designs by a more simple and to this extent less expensive design and particularly good maintenance characteristics.

I claim:

1. An arrangement for continuous feeding of an extruder of plastics, comprising: a weighing container with a discharge flap; a casing receiving said weighing container and having an upper part and a lower part; a weighing bar in said upper part of said casing, said lower part being closed and having a hopper shape; a casing cover plate carrying said weighing container with said weighing bar; a material feed nozzle mounted on said casing cover plate; an outlet chute connected to said lower part of said casing; a level switch in said chute for signalling when the next batch to be fed to the extruder is to be weighed; distance spacing elements supporting said casing cover plate on said lower part of said casing; vibration dampers under said casing cover plate; an elastic hose element surrounding said weighing container and having secured sealed ends, said elastic hose element extending between said casing cover plate and said lower part of said casing.

2. An arrangement as defined in claim 1, wherein said distance spacing elements supporting said casing cover plate are located with a clearance space around a circumference of said elastic hose element at least in an area of a semi-circle.

3. An arrangement as defined in claim 1, wherein said elastic hose element surrounding said weighing container is comprised of anti-static filter fabric.

4. An arrangement as defined in claim 1, wherein said elastic hose element surrounding said weighing container comprises transparent foil.

5. An arrangement as defined in claim 1, wherein said elastic hose element surrounding said weighing container is comprised of anti-static filter fabric and transparent foil.

6. An arrangement as defined in claim 1, wherein said elastic hose element has a shape of a downward-tapering truncated cone.

7. An arrangement as defined in claim 1, including easily releasable quick-acting closures for fastening said elastic hose element to said casing cover plate and to said lower part of said casing.

8. An arrangement for continuous feeding of an extruder of plastics, comprising: a weighing container with a discharge flap; a casing receiving said weighing container and having an upper part and a lower part; a weighing bar in said upper part of said casing, said lower part being closed and having a hopper shape; a casing cover plate carrying said weighing container with said weighing bar; a material feed nozzle mounted on said casing cover plate; an outlet chute connected to said lower part of said casing; a level switch in said chute for signalling when the next batch to be fed to the extruder is to be weighed and thereby determining the weight of material to be processed per unit of time; distance spacing elements supporting said casing cover plate on said lower part of said casing; vibration dampers under said casing cover plate; an elastic hose element surrounding said weighing container and having secured sealed ends, said elastic hose element extending between said casing cover plate and said lower part of said casing.

9. An arrangement for continuous feeding of an extruder of plastics, comprising: a weighing container with a discharge flap; a casing receiving said weighing container and having an upper part and a lower part; a weighing bar in said upper part of said casing, said lower part being closed and having a hopper shape; a casing cover plate carrying said weighing container with said weighing bar; a material feed nozzle mounted on said casing cover plate; an outlet chute connected to said lower part of said casing; a level switch in said chute for signalling when the next batch to be fed to the extruder is to be weighed and thereby determining the weight of material to be processed per unit of time; distance spacing elements supporting said casing cover plate on said lower part of said casing; vibration dampers under said casing cover plate; an elastic hose element surrounding said weighing container and having secured sealed ends, said elastic hose element extending between said casing cover plate and said lower part of said casing; said distance spacing elements supporting said casing cover plate being located with a clearance around a circumference of said elastic hose element at least in an area of a semi-circle; said elastic hose element surrounding said weighing container comprising anti-static filter fabric; said elastic hose element having a shape of a downward-tapering truncated cone; and easily releasable quick-acting closures for fastening said elastic hose element to said casing cover plate and said lower part of said casing.

* * * * *